(12) United States Patent
Lee

(10) Patent No.: US 7,737,802 B2
(45) Date of Patent: Jun. 15, 2010

(54) PASSIVE EQUALIZER WITH NEGATIVE IMPEDANCE TO INCREASE A GAIN

(75) Inventor: Tzuen-Hwan Lee, Hsinchu (TW)

(73) Assignee: Synerchip Technology Co., Ltd., Hsinchu (TW)

( * ) Notice: Subject to any disclaimer, the term of this patent is extended or adjusted under 35 U.S.C. 154(b) by 161 days.

(21) Appl. No.: 12/222,745

(22) Filed: Aug. 15, 2008

(65) Prior Publication Data
US 2009/0295514 A1      Dec. 3, 2009

(30) Foreign Application Priority Data
May 29, 2008     (TW) .............................. 97119835 A

(51) Int. Cl.
*H04B 3/14* (2006.01)
(52) U.S. Cl. ..................................... 333/28 R
(58) Field of Classification Search ............... 333/28 R, 333/18
See application file for complete search history.

(56) References Cited

U.S. PATENT DOCUMENTS 7,504,906 B2 *  3/2009  Chu ........................ 333/28 R
2008/0238587 A1 * 10/2008  Shin et al. .................. 333/28 R

* cited by examiner

*Primary Examiner*—Stephen E Jones
(74) *Attorney, Agent, or Firm*—Bacon & Thomas, PLLC

(57) ABSTRACT

A passive equalizer with negative impedance to increase a gain includes a first RC loop, a second RC loop, a cascade RL circuit and a cross-coupled inverter unit. Each of the first and the second RC loops includes a first resistor, a second resistor connected in series to the first resistor at a node to thereby form a resistor series, and a capacitor connected in parallel to the resistor series. The cascade RL circuit is connected between the RC loops and includes a fifth resistor, a sixth resistor and an inductor connected between the fifth resistor and the sixth resistor. The cross-coupled inverter unit is connected in parallel to the RL circuit and connected between the RC loops for using the feature of negative impedance to obtain an excellent high-frequency gain.

14 Claims, 10 Drawing Sheets

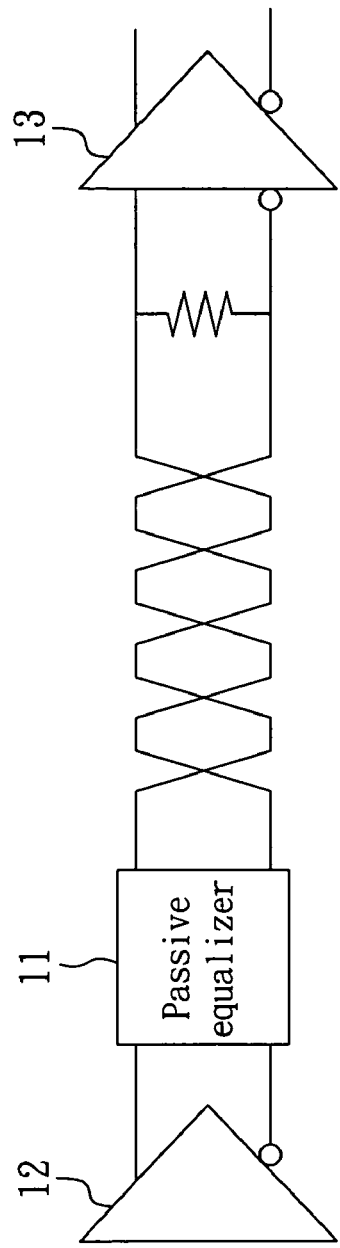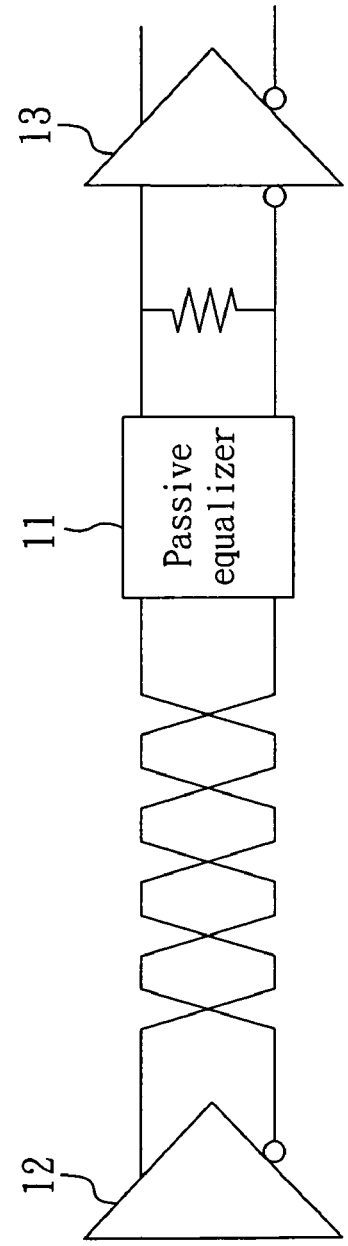
FIG. 1a (PRIOR ART)
FIG. 1b (PRIOR ART)

PASSIVE EQUALIZER WITH NEGATIVE IMPEDANCE TO INCREASE A GAIN

BACKGROUND OF THE INVENTION

1. Field of the Invention

The present invention relates to a passive equalizer and, more particularly, to a passive equalizer with negative impedance to increase a gain.

2. Description of Related Art

Passive equalizers are widely used in a high-speed serial communication link such as a high definition multimedia interface (HDMI). FIGS. 1a and 1b show a schematic diagram of a communication system with a typical passive equalizer 11. The passive equalizer 11 can be implemented as required at a position close to the transmitting side 1, as shown in FIG. 1a, or the receiving side, as shown in FIG. 1b, for compensation. FIG. 2 is a circuit diagram of a typical passive equalizer, which is comprised of passive elements such as resistor R, inductor L and capacitor C. FIG. 3 is a graph of a frequency response of gains for a typical passive equalizer. As shown in FIG. 3, the passive equalizer at high frequency has a gain close to −0.5 dB in the vertical axis, and close to one at most. Accordingly, the high frequency gain is restrained, and the signal restoring capability is poor. In addition, the feature values of the passive elements in the typical passive equalizer cannot be easily adjusted, resulting in losing the flexibility on use.

Therefore, it is desirable to provide an improved passive equalizer to mitigate and/or obviate the aforementioned problems.

SUMMARY OF THE INVENTION

The object of the present invention is to provide a passive equalizer, which can use negative impedance to increase a gain.

According to a feature of the invention, a passive equalizer with negative impedance to increase a gain is provided. The passive equalizer includes a first RC loop, a second RC loop, a cascade RL circuit and a cross-coupled inverter unit. The first RC loop includes a first resistor, a second resistor connected in series to the first resistor at a first node to thereby form a first resistor series, and a first capacitor connected in parallel to the first resistor series. The second RC loop includes a third resistor, a fourth resistor connected in series to the third resistor at a second node to thereby form a second resistor series, and a second capacitor connected in parallel to the second resistor series. The cascade RL circuit is connected between the first node and the second node and includes a fifth resistor, a sixth resistor and an inductor connected between the fifth resistor and the sixth resistor. The cross-coupled inverter unit is connected in parallel to the cascade RL circuit and connected between the first node and the second node.

According to another feature of the invention, a passive equalizer with negative impedance to increase a gain is provided. The passive equalizer includes a first RC loop, a second RC loop, a cascade RL circuit, a first cross-coupled inverter unit and a second cross-coupled inverter unit. The first RC loop includes a first resistor, a second resistor connected in series to the first resistor at a first node to thereby form a first resistor series, and a first capacitor connected in parallel to the first resistor series. Two ends of the first RC loop function as differential positive input and output terminals respectively. The second RC loop includes a third resistor, a fourth resistor connected in series to the third resistor at a second node to thereby form a second resistor series, and a second capacitor connected in parallel to the second resistor series. Two ends of the second RC loop function as differential negative input and output terminals respectively. The cascade RL circuit is connected between the first node and the second node and includes a fifth resistor, a sixth resistor and an inductor connected between the fifth resistor and the sixth resistor. The first cross-coupled inverter unit is connected in parallel to the cascade RL circuit and connected between the differential positive input terminal and the differential negative input terminal. The second cross-coupled inverter unit is connected in parallel to the cascade RL circuit and connected between the differential positive output terminal and the differential negative output terminal.

According to a further feature of the invention, a passive equalizer with negative impedance to increase a gain is provided. The passive equalizer includes a first RC loop, a second RC loop, a cascade RL circuit and a cross-coupled inverter unit. The first RC loop includes a first resistor with a first node and a second node at two ends and a first capacitor connected between the first node and the second node. The second RC loop includes a second resistor with a third node and a fourth node at two ends and a second capacitor connected between the third node and the fourth node. The cascade RL circuit is connected between the first node and the third node and includes a third resistor, a fourth resistor and an inductor connected between the third resistor and the fourth resistor. The cross-coupled inverter unit is connected in parallel to the cascade RL circuit and connected between the first node and the third node.

According to a further another feature of the invention, a passive equalizer with negative impedance to increase a gain is provided. The passive equalizer includes a first RC loop, a second RC loop, a cascade RL circuit and a cross-coupled inverter unit. The first RC loop includes a first resistor with a first node and a second node at two ends and a first capacitor connected between the first node and the second node. The second RC loop includes a second resistor with a third node and a fourth node at two ends and a second capacitor connected between the third node and the fourth node. The cascade RL circuit is connected between the first node and the third node and includes a third resistor, a fourth resistor and an inductor connected between the third resistor and the fourth resistor. The cross-coupled inverter unit is connected in parallel to the cascade RL circuit and connected between the second node and the fourth node.

Other objects, advantages, and novel features of the invention will become more apparent from the following detailed description when taken in conjunction with the accompanying drawings.

BRIEF DESCRIPTION OF THE DRAWINGS

FIG. 1 is a schematic diagram of a communication system with a typical passive equalizer;

DETAILED DESCRIPTION OF THE PREFERRED EMBODIMENT

Figure 4:
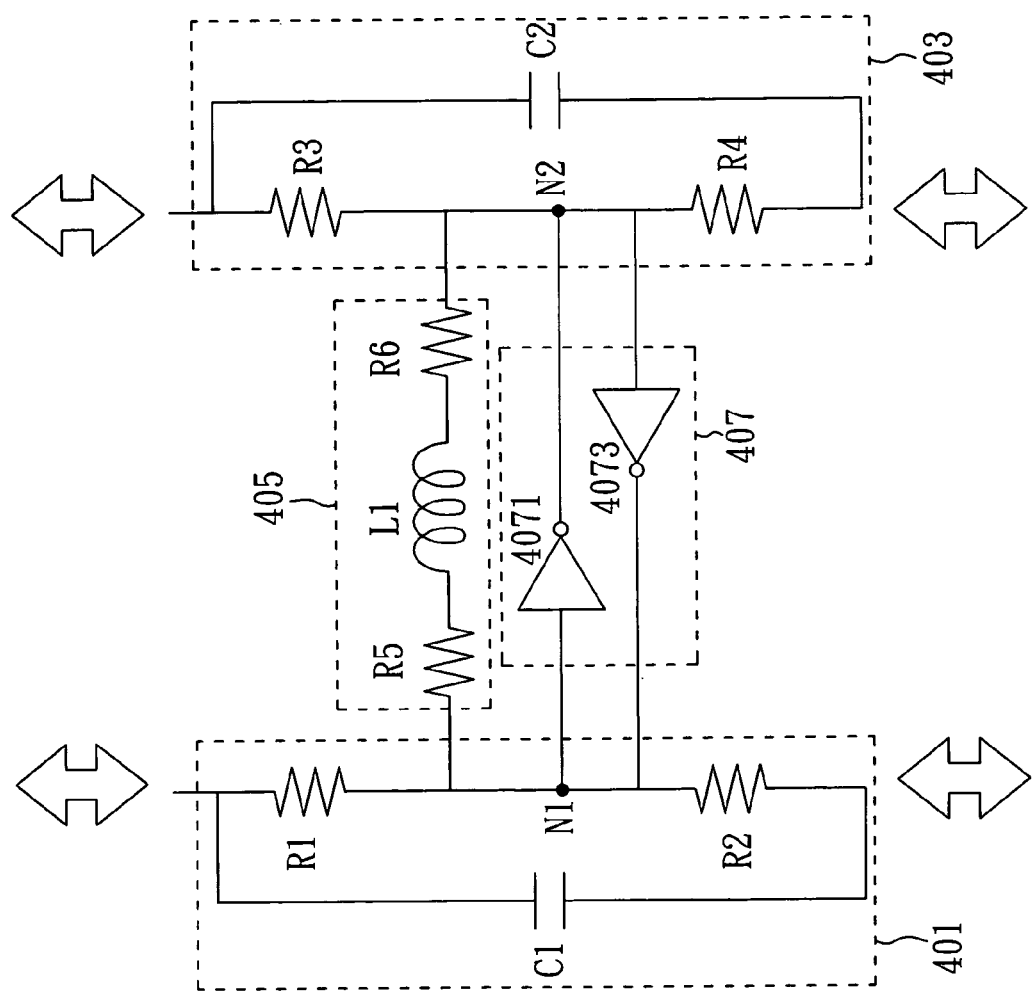
FIG. 4 is a circuit of a passive equalizer with negative impedance to increase a gain in accordance with an embodiment of the invention.

FIG. 4 is a circuit of a passive equalizer with negative impedance to increase a gain in accordance with an embodiment of the invention. In FIG. 4, the passive equalizer includes two RC loops 401 and 403, a cascade RL circuit 405 and a cross-coupled inverter unit 407.

The RC loop 401 includes a capacitor C1, a resistor R1 and a resistor R2. A resistor series R1-R2 is formed by connecting the resistors R1 and R2 at a node N1. The capacitor C1 is connected in parallel to the resistor series R1-R2. The RC loop 403 includes a capacitor C2, a resistor R3 and a resistor R4. A resistor series R3-R4 is formed by connecting the resistors R3 and R4 at a node N2. The capacitor C2 is connected in parallel to the resistor series R3-R4. The cascade RL circuit 405 includes an inductor L1, a resistor R5 and a resistor R6. Two ends of the inductor L1 are connected to the resistors R5 and R6 respectively. Two ends of the cascade RL circuit 405 are connected to the nodes N1 and N2 respectively. The cross-coupled inverter unit 407 is connected in parallel to the cascade RL circuit 405 and also has two ends respectively connected to the nodes N1 and N2. The cross-coupled inverter unit 407 includes two inverters 4071 and 4073. The inverter 4071 has an input terminal connected to the node N1 and an output terminal connected to the node N2. The inverter 4073 has an output terminal connected to the node N1. In this embodiment, the passive equalizer is an equalizer for applications with bi-direction signal transmission. That is, each end of the RC loop 401 or 403 can act as an input or output terminal.

At a low frequency, the passive equalizer can have a circuit gain of R5/(R1+R5), and accordingly the resistance of the resistors can be adjusted to determine the circuit gain. Since the cross-coupled inverter unit 407 has the feature of negative impedance, which is equivalent to a voltage source. Accordingly, at a high frequency operation, the equivalent voltage source can provide a current to the inductors and the capacitors. Thus, it effectively increases the high-frequency gain, and the active element can assist the passive elements. In this case, only a small amount of consumed current is required for obtaining the good performance.

Figure 5:
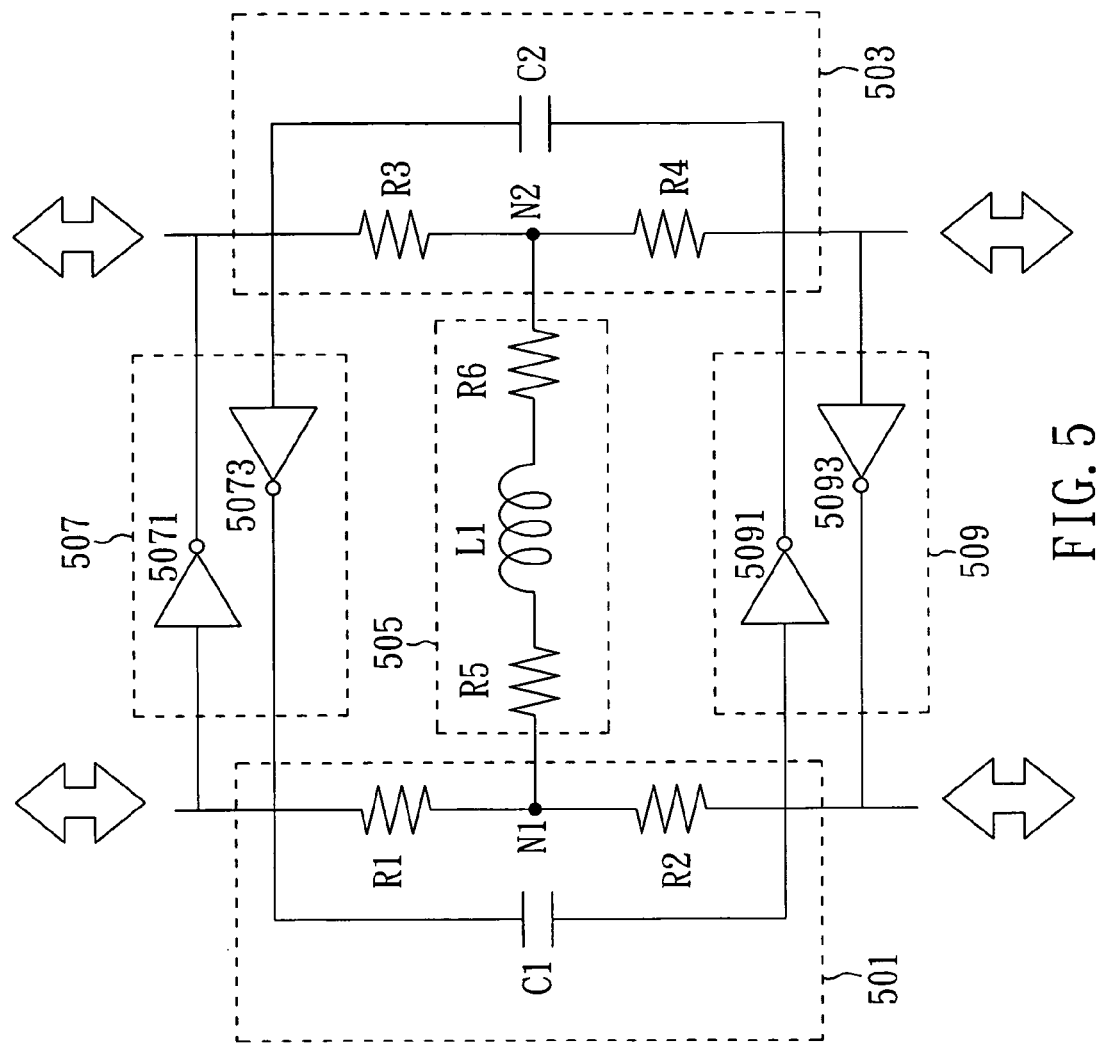
FIG. 5 is a circuit of a passive equalizer with negative impedance to increase a gain in accordance with another embodiment of the invention.

FIG. 5 is a circuit of a passive equalizer with negative impedance to increase a gain according to another embodiment of the invention. In FIG. 5, the passive equalizer includes two RC loops 501 and 503, a cascade RL circuit 505, two cross-coupled inverter units 507 and 509. The RC loop 501 includes a capacitor C1 and two resistors R1 and R2. A resistor series R1-R2 is formed by connecting the resistor R1 to the resistor R2 at a node N1. The capacitor C1 is connected in parallel to the resistor series R1-R2. Two ends of the RC loop 501 function as differential positive input and output terminals respectively. The RC loop 503 includes a capacitor C2 and two resistors R3 and R4. A resistor series R3-R4 is formed by connecting the resistor R3 to the resistor R4 at a node N2. The capacitor C2 is connected in parallel to the resistor series R3-R4. Two ends of the RC loop 503 function as differential negative input and output terminals respectively. The cascade RL circuit 505 includes an inductor L1 and two resistors R5 and R6. The inductor L1 is connected between the resistors R5 and R6. Two ends of the cascade RL circuit 505 are connected to the nodes N1 and N2 respectively. The cross-coupled inverter unit 507 is connected in parallel to the cascade RL circuit 505. Two ends of the cross-coupled inverter unit 507 are connected to the differential positive and negative input terminals respectively. Two ends of the cross-coupled inverter unit 509 are connected to the differential positive and negative output terminals respectively. The cross-coupled inverter unit 507 includes two inverters 5071 and 5073. The inverter 5071 has an input terminal connected to the differential positive input terminal and an output terminal connected to the differential negative input terminal. The inverter 5073 has an input terminal connected to the differential negative input terminal and an output terminal connected to the differential positive input terminal. The cross-coupled inverter unit 509 includes two inverters 5091 and 5093. The inverter 5091 has an input terminal connected to the differential positive output terminal and an output terminal connected to the differential negative output terminal. The inverter 5093 has an input terminal connected to the differential negative output terminal and an output terminal connected to the differential positive output terminal.

In this embodiment, the passive equalizer is an equalizer for applications with bi-direction signal transmission. That is, each end of the RC loop 401 or 403 can act as an input or output terminal.

At a low frequency, the passive equalizer can have a circuit gain of R5/(R1+R5), and accordingly the resistance of the resistors can be adjusted to determine the circuit gain. Since the cross-coupled inverter units 507 and 509 have the feature of negative impedance, which is equivalent to a voltage source. Accordingly, at a high frequency operation, the equivalent voltage source can provide a current to the inductors and the capacitors. Thus, it effectively increases the high-frequency gain, and the active element can assist the passive elements. In this case, only a small amount of consumed current is required for obtaining the good performance.

Figure 6:
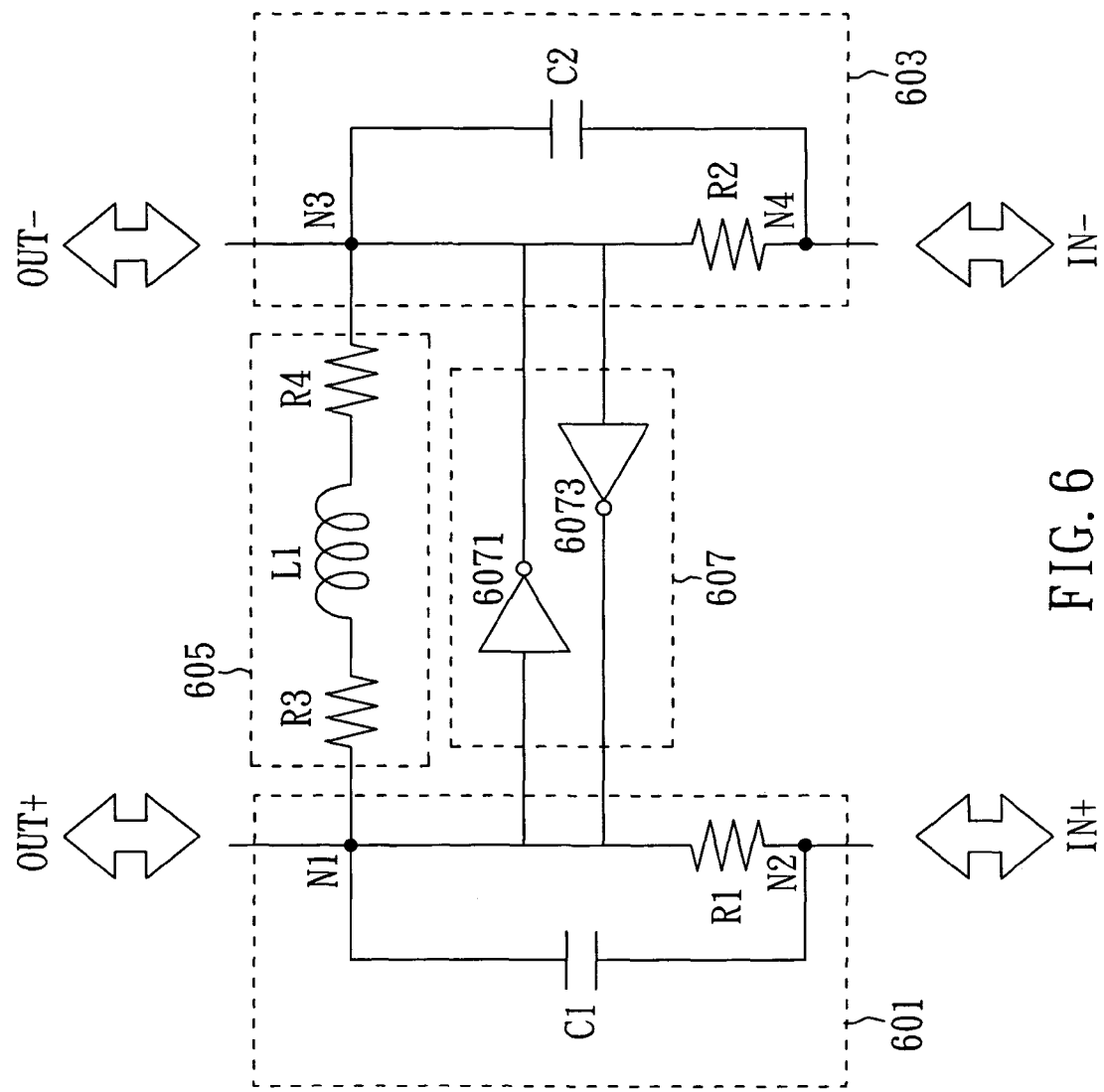
FIG. 6 is a circuit of a passive equalizer with negative impedance to increase a gain in accordance with a further embodiment of the invention.

FIG. 6 is a circuit of a passive equalizer with negative impedance to increase a gain in accordance with a further embodiment of the invention. In FIG. 6, the passive equalizer includes two RC loops 601 and 603, a cascade RL circuit 605 and a cross-coupled inverter unit 607.

The RC loop 601 includes a capacitor C1 and a resistor R1. Two ends of the resistor R1 are nodes N1 and N2 respectively. The capacitor C2 is connected between the nodes N1 and N2. The RC loop 603 includes a resistor R2 and a capacitor C2. Two ends of the resistor R2 are nodes N3 and N4 respectively. The capacitor C2 is connected between the nodes N3 and N4. The cascade RL circuit 605 includes an inductor L1 and two resistors R3 and R4. Two ends of the inductor L1 are connected to the resistors R3 and R4 respectively. Two ends of the cascade RL circuit 605 are connected to the nodes N1 and N3 respectively. The cross-coupled inverter unit 607 is connected in parallel to the cascade RL circuit 605. Two ends of the cross-coupled inverter unit 607 are connected to the nodes N1 and N3 respectively. The cross-coupled inverter unit 607 includes two inverters 6071 and 6073. The inverter 6071 has an input terminal connected to the node N1 and an output terminal connected to the node N3. The inverter 6073 has an input terminal connected to the node N3 and an output terminal connected to the node N1. The node N1 is connected to a differential positive output terminal. The node N2 is connected to a differential positive input terminal. The node N3 is connected to a differential negative output terminal. The node N4 is connected to a differential negative input terminal. The passive equalizer is an equalizer for applications with single direction signal transmission, such as HDMI/DisplayPort.

At a low frequency, the passive equalizer can have a circuit gain of R3/(R1+R3), and accordingly the resistance of the resistors can be adjusted to determine the circuit gain. Since the cross-coupled inverter unit 607 has the feature of negative impedance, which is equivalent to a voltage source. Accordingly, at a high frequency operation, the equivalent voltage source can provide a current to the inductors and the capacitors. Thus, it effectively increases the high-frequency gain, and the active element can assist the passive elements. In this case, only a small amount of consumed current is required for obtaining the good performance.

Figure 7:
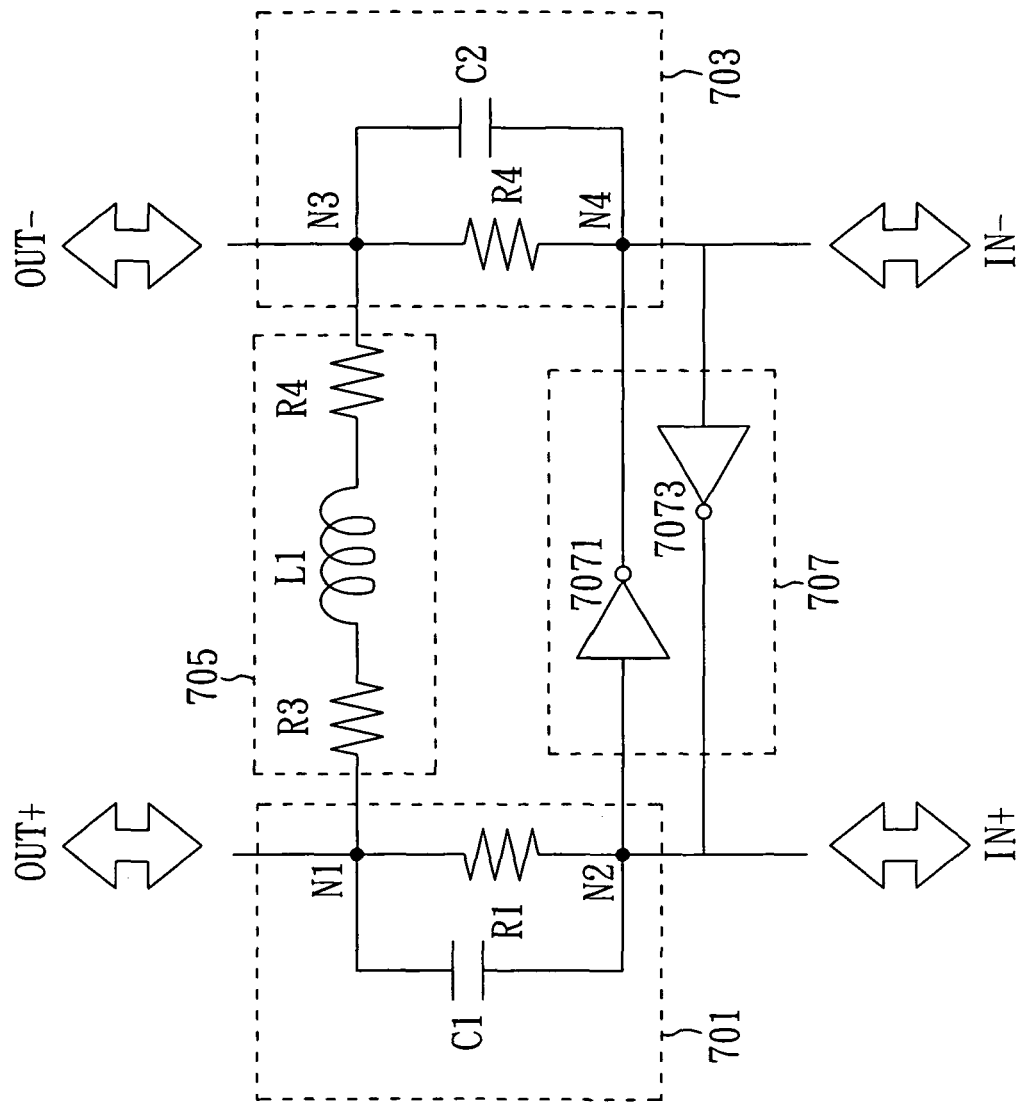
FIG. 7 is a circuit of a passive equalizer with negative impedance to increase a gain in accordance with a further another embodiment of the invention.

FIG. 7 is a circuit of a passive equalizer with negative impedance to increase a gain according to a further another embodiment of the invention. In FIG. 7, the passive equalizer includes two RC loops 701 and 703, a cascade RL circuit 705 and a cross-coupled inverter unit 707.

The RC loop 701 includes a capacitor C1 and a resistor R1. Two ends of the resistor R1 are nodes N1 and N2 respectively. The capacitor C2 is connected between the nodes N1 and N2. The RC loop 703 includes a capacitor C2 and a resistor R2. Two ends of the resistor R2 are nodes N3 and N4 respectively. The capacitor C2 is connected between the nodes N3 and N4. The cascade RL circuit 705 includes an inductor L1 and two resistors R3 and R4. Two ends of the inductor L1 are connected to the resistors R3 and R4 respectively. Two ends of the cascade RL circuit 705 are connected to the nodes N1 and N3 respectively. The cross-coupled inverter unit 707 is connected in parallel to the cascade RL circuit 705. Two ends of the cross-coupled inverter unit 707 are connected to the nodes N2 and N4 respectively. The cross-coupled inverter unit 707 includes two inverters 7071 and 7073. The inverter 7071 has an input terminal connected to the node N2 and an output terminal connected to the node N4. The inverter 7073 has an input terminal connected to the node N4 and an output terminal connected to the node N2. The node N1 is connected to a differential positive output terminal. The node N2 is connected to a differential positive input terminal. The node N3 is connected to a differential negative output terminal. The node N4 is connected to a differential negative input terminal. The passive equalizer is an equalizer for applications with single direction signal transmission, such as HDMI/DisplayPort.

At a low frequency, the passive equalizer can have a circuit gain of R3/(R1+R3), and accordingly the resistance of the resistors can be adjusted to determine the circuit gain. Since the cross-coupled inverter unit 707 has the feature of negative impedance, which is equivalent to a voltage source. Accordingly, at a high frequency operation, the equivalent voltage source can provide a current to the inductors and the capacitors. Thus, it effectively increases the high-frequency gain, and the active element can assist the passive elements. In this case, only a small amount of consumed current is required for obtaining the good performance.

Figure 8B:
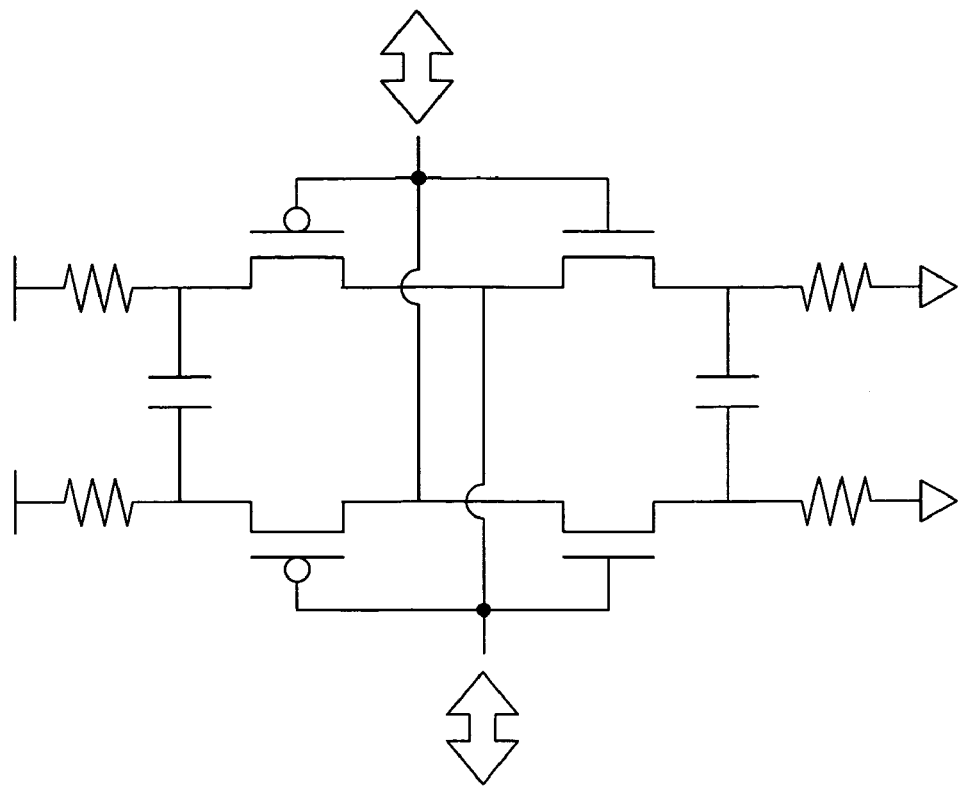
FIG. 8b is a circuit of a cross-coupled inverter unit of the passive equalizer of FIG. 5.
Figure 8A:
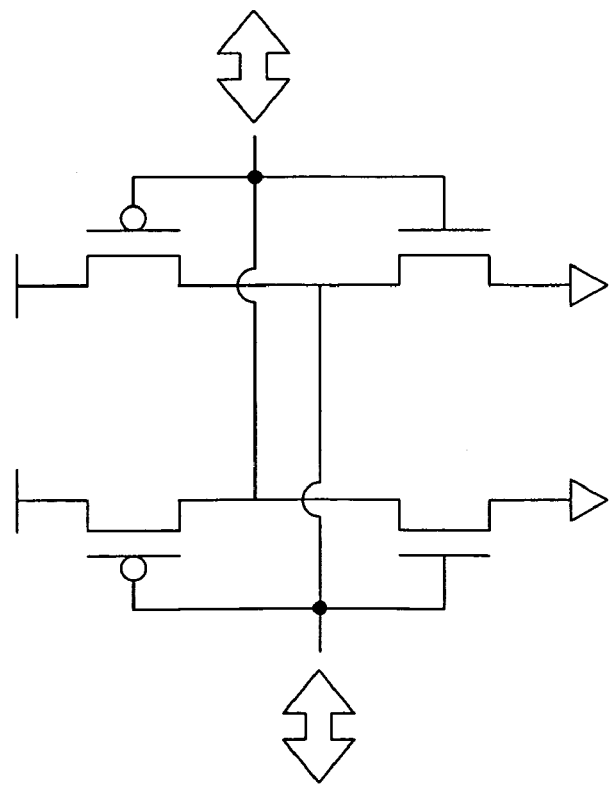
FIG. 8a is a circuit of a cross-coupled inverter unit of the passive equalizer of FIG. 4.
Figure 9B:
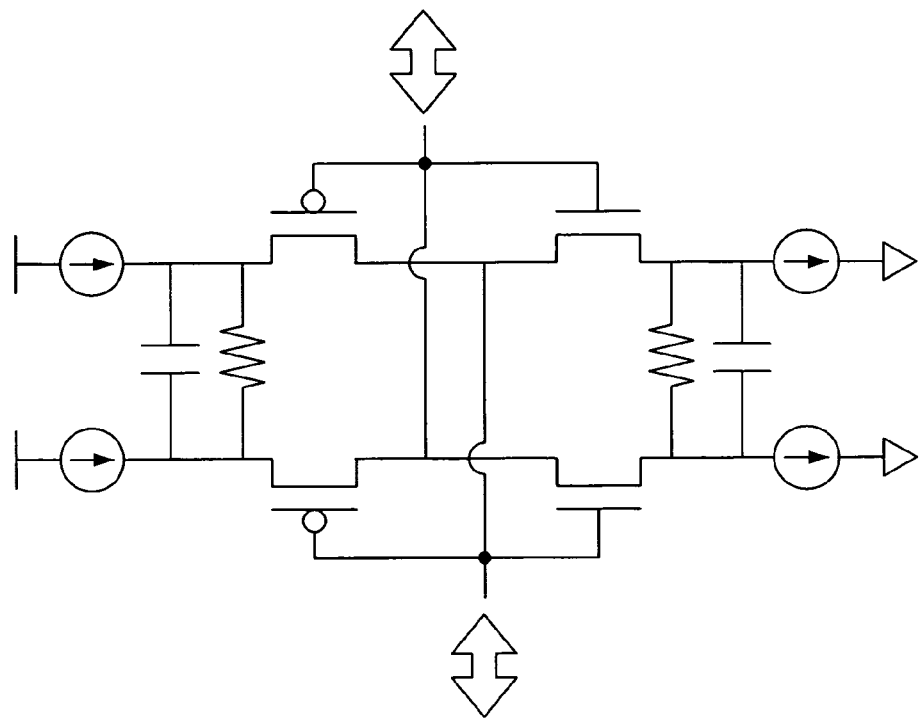
FIG. 9b is a circuit of a cross-coupled inverter unit of the passive equalizer of FIG. 7.
Figure 9A:
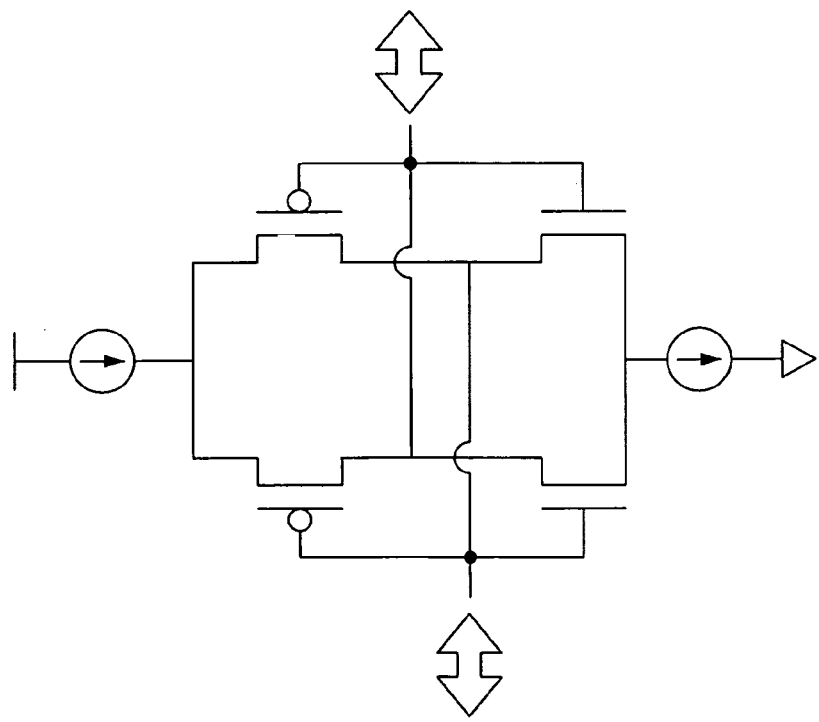
FIG. 9a is a circuit of a cross-coupled inverter unit of the passive equalizer of FIG. 6.

FIGS. 8a, 8b, 9a, 9b show a circuit of a cross-coupled inverter unit of the passive equalizer in accordance with the invention. The cross-coupled inverter unit of the passive equalizer in the invention can be implemented by two inverters (as shown in FIG. 8a), a differential amplifier (as shown in FIG. 9a), or a source-degeneration topology (as shown in FIGS. 8b, 9b).

Figure 2:
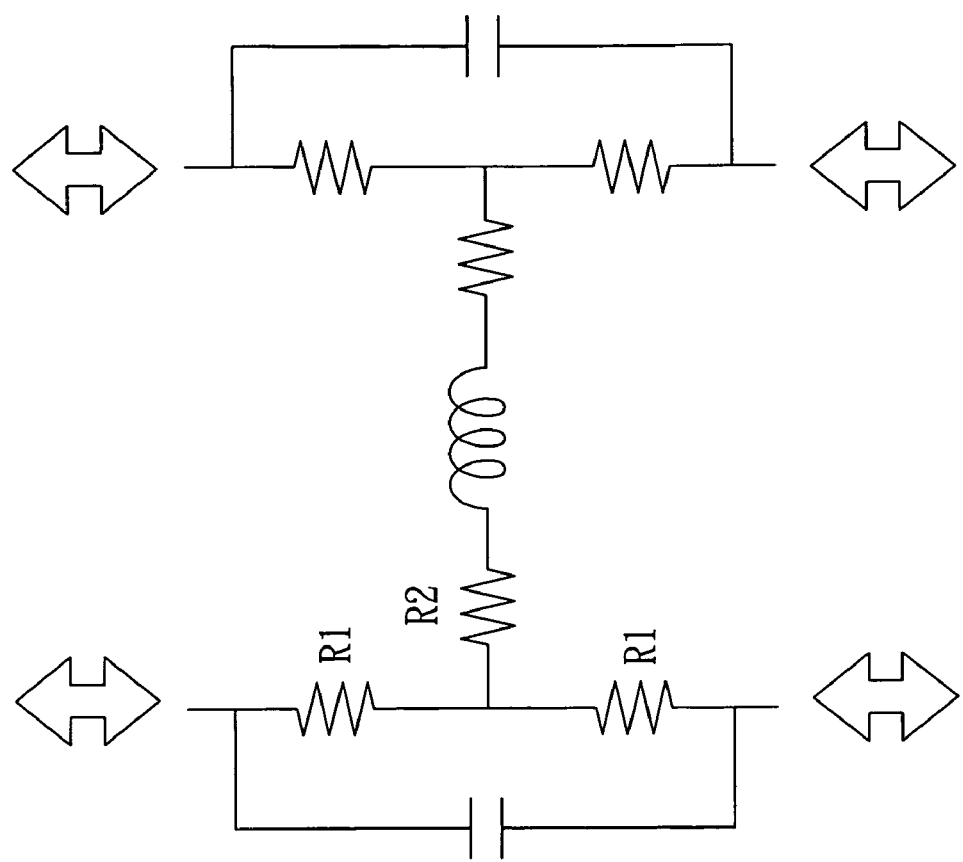
FIG. 2 is a circuit of a typical passive equalizer.
Figure 3:
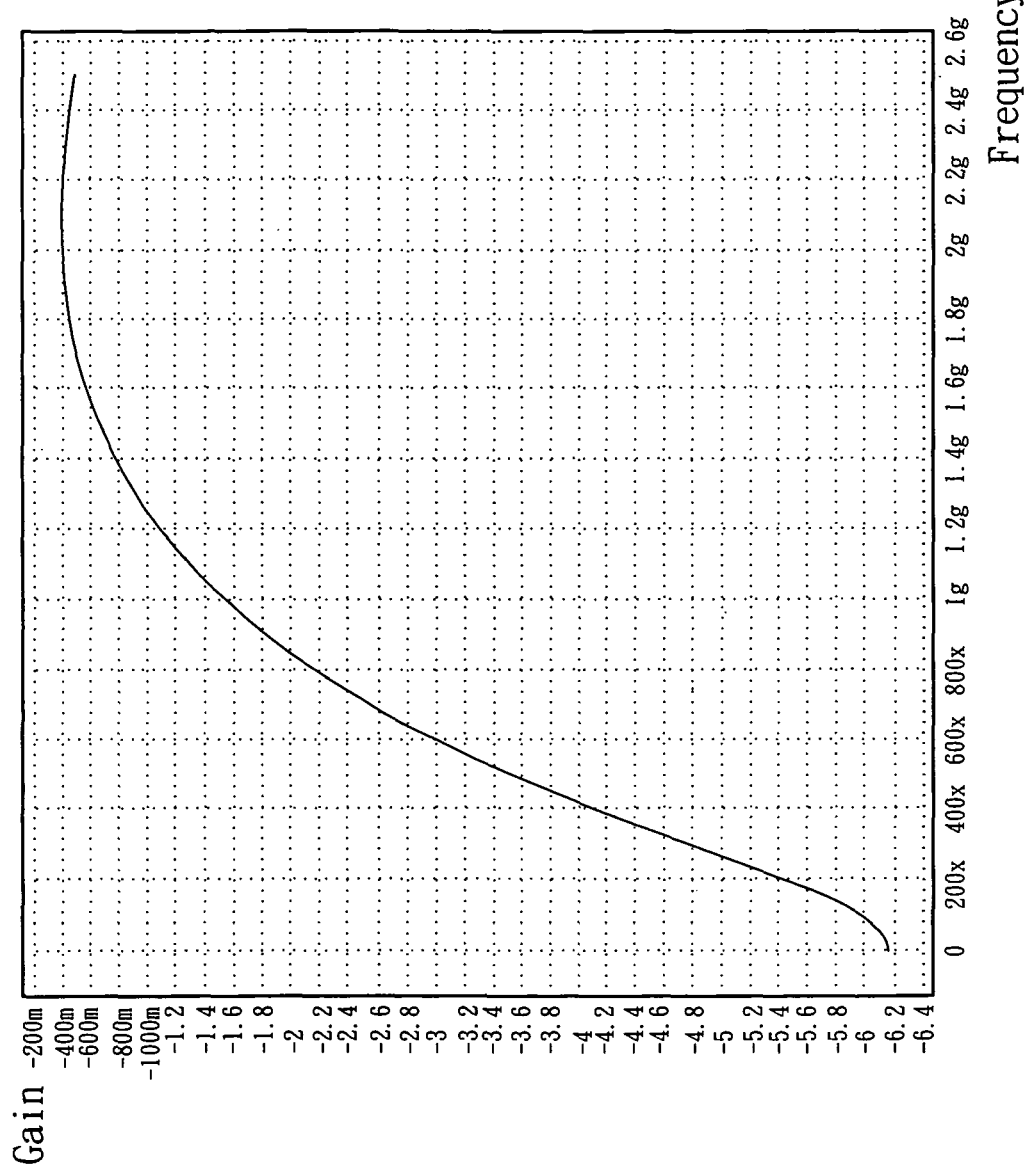
FIG. 3 is a graph of a frequency response of gains of a typical passive equalizer.
Figure 10:
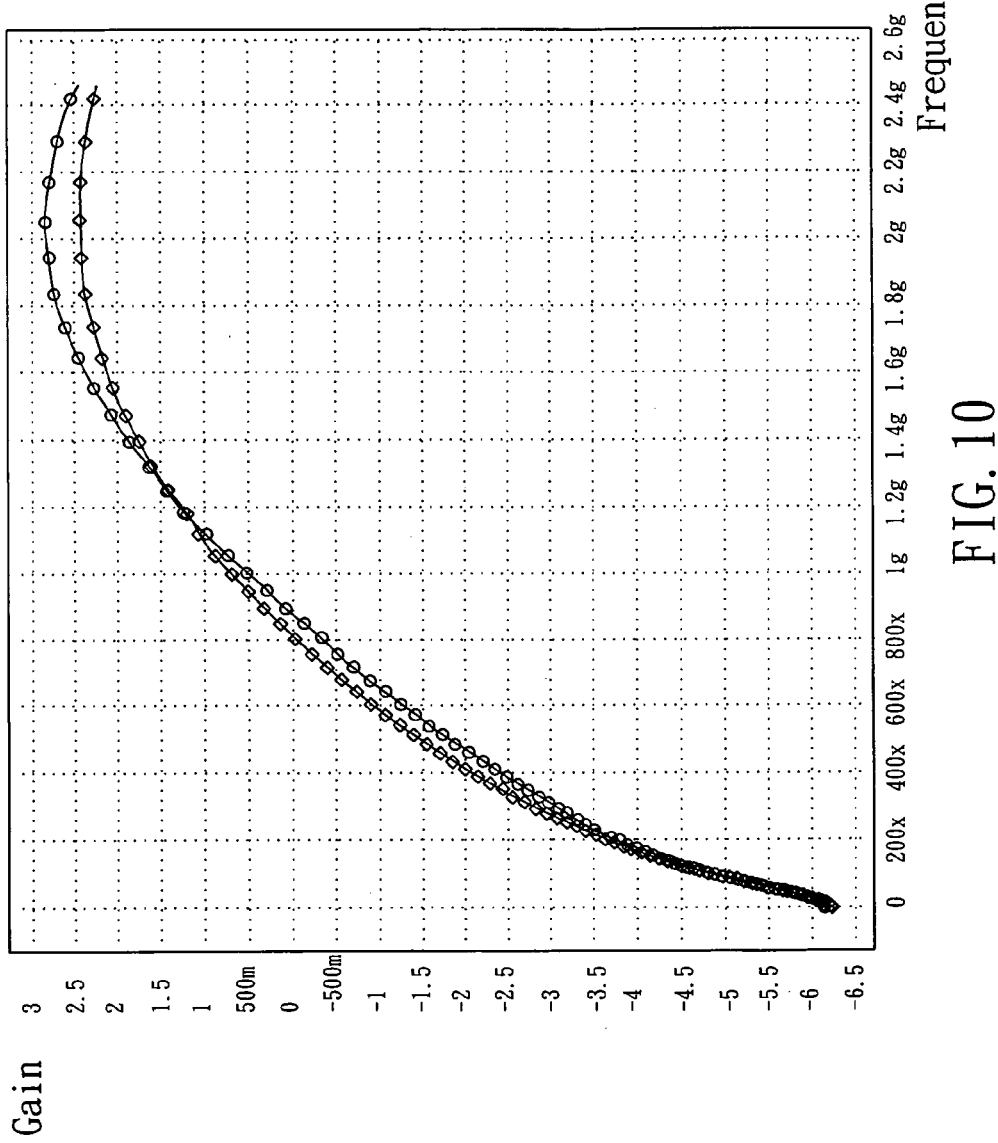
FIG. 10 is a graph of a frequency response of gains of a passive equalizer in accordance with the invention.

FIG. 10 is a graph of a frequency response of gains of a passive equalizer in accordance with the invention. As shown in FIG. 10, the gain frequency response of the passive equalizer of FIG. 4 is indicated by a solid curve, and the gain frequency response of the passive equalizer of FIG. 5 is indicated by a dotted curve. As shown in FIG. 3 (prior art) and FIG. 10 (the present invention), the passive equalizer at high frequency in the prior art is close to −0.5 dB on the vertical axis, and the passive equalizer at high frequency (2 GHz) in the invention is close to −2.5 dB on the vertical axis, which is much better than −0.5 dB in the prior art. Therefore, the passive equalizer is relatively improved at high frequency.

In view of the foregoing, it is known that, with a small amount of consumed power, the passive equalizer of the invention can use the negative impedance of the cross-coupled inverter unit to obtain the considerable improvement on high frequency gain.

Although the present invention has been explained in relation to its preferred embodiment, it is to be understood that many other possible modifications and variations can be made without departing from the spirit and scope of the invention as hereinafter claimed.

What is claimed is:

1. A passive equalizer with negative impedance to increase a gain, comprising:
    a first RC loop having a first resistor, a second resistor connected in series to the first resistor at a first node to thereby form a first resistor series, and a first capacitor connected in parallel to the first resistor series;
    a second RC loop having a third resistor, a fourth resistor connected in series to the third resistor at a second node to thereby form a second resistor series, and a second capacitor connected in parallel to the second resistor series;
    a cascade RL circuit connected between the first node and the second node and having a fifth resistor, a sixth resistor and an inductor connected between the fifth resistor and the sixth resistor; and
    a cross-coupled inverter unit connected in parallel to the cascade RL circuit and connected between the first node and the second node.

2. The passive equalizer as claimed in claim 1, wherein the cross-coupled inverter unit comprises a first inverter and a second inverter.

3. The passive equalizer as claimed in claim 2, wherein the first inverter has an input terminal connected to the first node and an output terminal connected to the second node, and the second inverter has an input terminal connected to the second node and an output terminal connected to the first node.

4. A passive equalizer with negative impedance to increase a gain, comprising:
    a first RC loop having a first resistor, a second resistor connected in series to the first resistor at a first node to thereby form a first resistor series, and a first capacitor connected in parallel to the first resistor series, wherein two ends of the first RC loop function as differential positive input and output terminals respectively;
    a second RC loop having a third resistor, a fourth resistor connected in series to the third resistor at a second node to thereby form a second resistor series, and a second capacitor connected in parallel to the second resistor series, wherein two ends of the second RC loop function as differential negative input and output terminals respectively;

a cascade RL circuit connected between the first node and the second node and having a fifth resistor, a sixth resistor and an inductor connected between the fifth resistor and the sixth resistor;

a first cross-coupled inverter unit connected in parallel to the cascade RL circuit and connected between the differential positive input terminal and the differential negative input terminal; and a second cross-coupled inverter unit connected in parallel to the cascade RL circuit and connected between the differential positive output terminal and the differential negative output terminal.

5. The passive equalizer as claimed in claim 4, wherein the first cross-coupled inverter unit comprises a first inverter and a second inverter.

6. The passive equalizer as claimed in claim 5, wherein the first inverter has an input terminal connected to the differential positive input terminal and an output terminal connected to the differential negative input terminal, and the second inverter has an input terminal connected to the differential negative input terminal and an output terminal connected to the differential positive input terminal.

7. The passive equalizer as claimed in claim 4, wherein the second cross-coupled inverter unit comprises a third inverter and a fourth inverter.

8. The passive equalizer as claimed in claim 7, wherein the third inverter has an input terminal connected the differential positive output terminal and an output terminal connected to the differential negative output terminal, and the fourth inverter has an input terminal connected to the differential negative output terminal and an output terminal connected to the differential positive output terminal.

9. A passive equalizer with negative impedance to increase a gain, comprising:

a first RC loop having a first resistor with a first node and a second node at two ends, and a first capacitor connected between the first node and the second node;

a second RC loop having a second resistor with a third node and a fourth node at two ends, and a second capacitor connected between the third node and the fourth node;

a cascade RL circuit connected between the first node and the third node and having a third resistor, a fourth resistor and an inductor connected between the third resistor and the fourth resistor; and a cross-coupled inverter unit connected in parallel to the cascade RL circuit and connected between the first node and the third node.

10. The passive equalizer as claimed in claim 9, wherein the cross-coupled inverter unit comprises a first inverter and a second inverter.

11. The passive equalizer as claimed in claim 10, wherein the first inverter has an input terminal connected to the first node and an output terminal connected to the third node, and the second inverter has an input terminal connected to the third node and an output terminal connected to the first node.

12. A passive equalizer with negative impedance to increase a gain, comprising:

a first RC loop having a first resistor with a first node and a second node at two ends and a first capacitor connected between the first node and the second node;

a second RC loop having a second resistor with a third node and a fourth node at two ends and a second capacitor connected between the third node and the fourth node;

a cascade RL circuit connected between the first node and the third node and having a third resistor, a fourth resistor and an inductor connected between the third resistor and the fourth resistor; and a cross-coupled inverter unit connected in parallel to the cascade RL circuit and connected between the second node and the fourth node.

13. The passive equalizer as claimed in claim 12, wherein the cross-coupled inverter unit comprises a first inverter and a second inverter.

14. The passive equalizer as claimed in claim 13, wherein the first inverter has an input terminal connected to the second node and an output terminal connected to the fourth node, and the second inverter has an input terminal connected to the fourth node and an output terminal connected to the second node.

* * * * *